United States Patent [19]

Bossmann

[11] Patent Number: 5,193,343

[45] Date of Patent: Mar. 16, 1993

[54] PRESSURE ELEMENT

[75] Inventor: Hans-Peter Bossmann, Wiesloch, Fed. Rep. of Germany

[73] Assignee: ABB Patent GmbH, Mannheim, Fed. Rep. of Germany

[21] Appl. No.: 756,905

[22] Filed: Sep. 9, 1991

[30] Foreign Application Priority Data

Sep. 7, 1990 [DE] Fed. Rep. of Germany ....... 4028405

[51] Int. Cl.[5] ............................................. F01C 5/00
[52] U.S. Cl. ............................................ 60/531; 60/530
[58] Field of Search ................. 92/34; 60/530, 531, 60/516, 649

[56] References Cited

U.S. PATENT DOCUMENTS

| | | | |
|---|---|---|---|
| 1,289,435 | 12/1918 | Fulton. | |
| 1,938,167 | 12/1933 | Baker | 60/531 |
| 2,080,576 | 5/1937 | Persons | 60/531 |
| 2,129,638 | 9/1938 | Baker | 60/531 |
| 3,099,222 | 7/1963 | Poliseo | 60/531 |
| 3,195,304 | 7/1965 | Stern et al. | 60/649 |
| 3,702,532 | 11/1972 | Low et al. | 60/516 |
| 3,911,682 | 10/1975 | Thompson | 60/531 |
| 4,341,075 | 7/1982 | Backlund | 60/531 |
| 4,848,445 | 7/1989 | Harper | 165/80.5 |

FOREIGN PATENT DOCUMENTS

| | | | |
|---|---|---|---|
| 0215105 | 9/1987 | Japan | 60/531 |
| 0580326 | 11/1977 | U.S.S.R. | 60/531 |
| 1000589 | 3/1983 | U.S.S.R. | 60/531 |
| 1048133 | 10/1983 | U.S.S.R. | 60/531 |

Primary Examiner—Thomas E. Denion
Attorney, Agent, or Firm—Herbert L. Lerner; Laurence A. Greenberg

[57] ABSTRACT

A pressure element can be used for generating traction forces and pressure forces. The pressure element has a first component serving as a ram and a second component having a variable length. The second component can be extended and an outward pressure force can thus be exerted through the first component.

5 Claims, 4 Drawing Sheets

PRESSURE ELEMENT

The invention relates to a pressure element for generating pressure forces.

Such components especially for use at high temperatures. Depending on the structure of the component, the resilient properties of metals or alloys are exploited. A required pressure can also be generated by the use of devices in the form of traction rods and push rods. In that case, bias or different coefficients of thermal extension are combined. The known components are disposed in such a way that in most cases the pressure is transferred from a cooler zone through auxiliary structures into hot zones. A disadvantage of such devices is that the pressure does not remain constant but instead it changes with the deflection or extension of the component. Moreover, many components, which are used for the above-mentioned purposes, lose their spring force due to material fatigue at high temperatures and extend under a load. In most cases, complicated auxiliary structures with thermal losses are necessary for compensating the disadvantages.

It is accordingly an object of the invention to provide a pressure element, which overcomes the hereinafore-mentioned disadvantages of the heretofore-known devices of this general type and by means of which a lasting and constant pressure, whose magnitude depends only on the temperature, can be generated even at high temperatures.

With the foregoing and other objects in view there is provided, in accordance with the invention, a pressure element for generating pressure forces, comprising a first movably mounted component, a second component in communication with the first component, and means disposed in the pressure element for varying the length of the second component.

According to the invention, the length of a length-variable component is changed by means of at least one substance, which has a defined vapor pressure at a defined temperature, in such a way that a pressure can be exerted on adjoining components by means of a component serving as a ram. Through the use of a combination of a plurality of substances which are disposed in one or various chambers, pressures of very defined magnitude can be exerted on the ram at defined temperatures. The use of the pressure element according to the invention is possible especially at temperatures between 300° and 1100° C. If required, the pressure element can also be used for generating traction forces. If, for example, the pressure element is installed in the heated state at a defined point of a device, the length-variable part of the pressure element shortens when the temperature is reduced. A traction force is exerted on a device which is connected to the pressure element through the shortening component of the pressure element.

In accordance with another feature of the invention, the second component is a hollow body having lateral boundary surfaces in the form of bellows or a corrugated tube.

In accordance with a further feature of the invention, the hollow body has lateral boundary surfaces, and the length varying means are in the form of at least one substance disposed in the hollow body having two phases at a defined temperature providing means for extending the lateral boundary surfaces.

In accordance with an added feature of the invention, the length varying means are in the form of at least one alkali metal disposed in the hollow body.

In accordance with an additional feature of the invention, the length varying means are in the form of a material selected from the group consisting of sodium and arsenic disposed in the hollow body.

In accordance with yet another feature of the invention, the hollow body is subdivided into at least two chambers, and the length varying means are in the form of at least two different substances disposed in the at least two chambers for extending the hollow body.

In accordance with a concomitant feature of the invention, the substances are cesium disposed in one of the chambers and arsenic disposed in another of the chambers.

Other features which are considered as characteristic for the invention are set forth in the appended claims.

Although the invention is illustrated and described herein as embodied in a pressure element, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
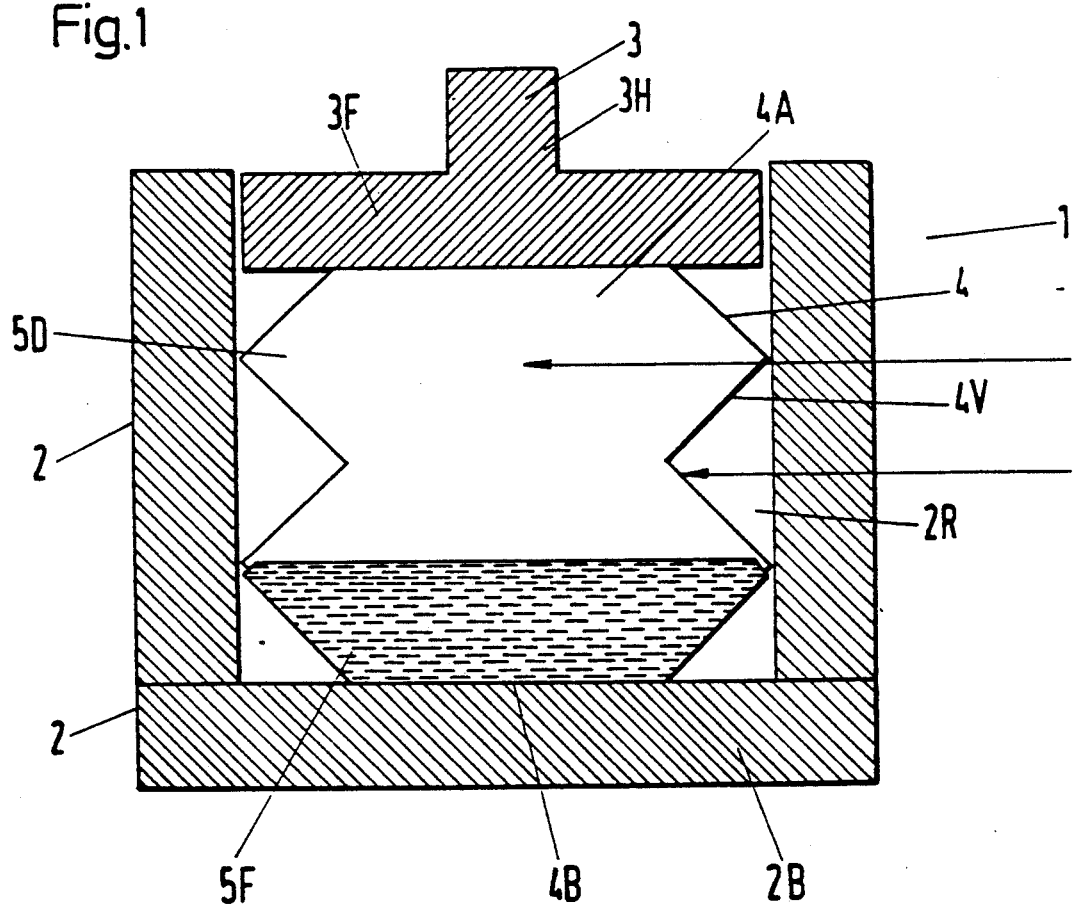
FIG. 1 is a diagrammatic, longitudinal-sectional view of a pressure element.
Figure 4:
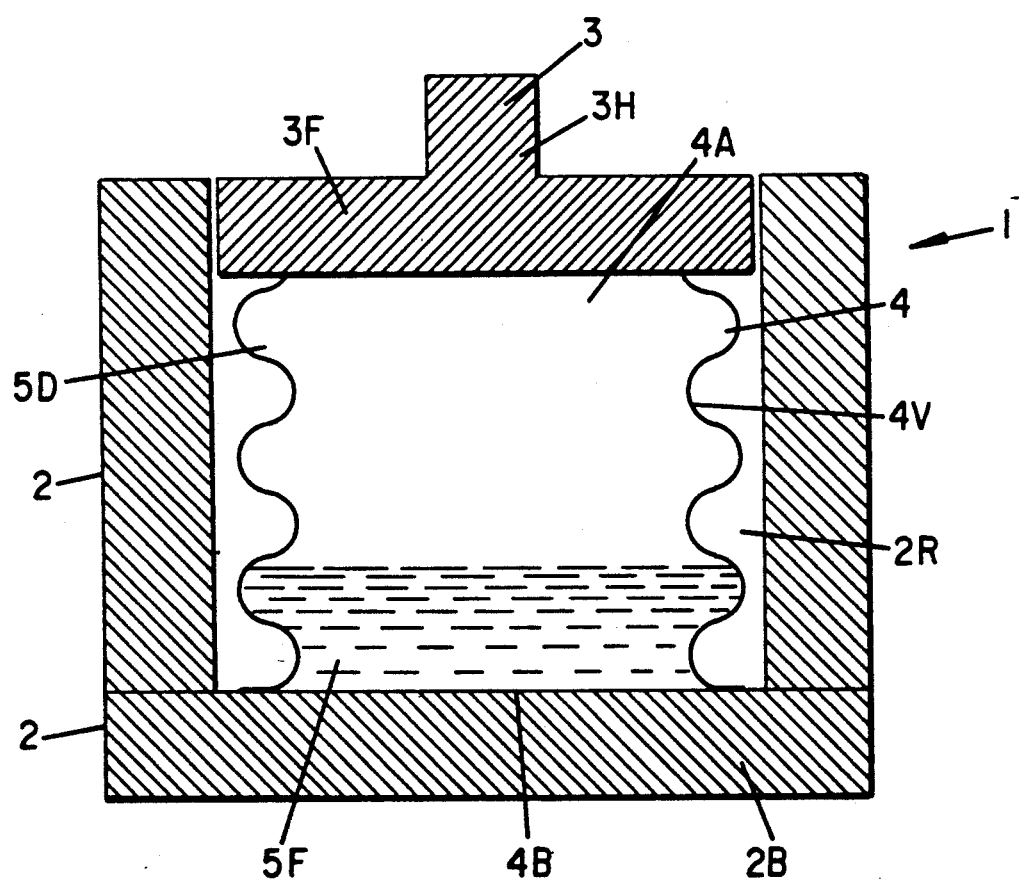
FIG. 4 is a view similar to that of FIG. 1, showing a further embodiment of the pressure element of the invention.

Referring now to the figures of the drawing in detail and first, particularly, to FIG. 1 thereof, there is seen a pressure element 1 that is bounded by a housing 2 which is made in a cup-shaped or cuboid form. The housing 2 is made of a corrosion-resistant material having a melting point which is above 1100° C. A first movably mounted component 3 is movably disposed in an opening region of the housing 2 in the illustration shown in the drawing. The component 3 has the shape of a ram and it can be moved within the housing. The component or ram 3 has a surface 3F which is disposed on a first end surface 4A of a second component 4. The ram 3 can be loosely disposed on the end surface 4A or it can be permanently connected thereto. The component 4 is constructed as a hollow body and has side surfaces 4V of variable length. The side surfaces 4V are constructed in the form of bellows. If the component 4 has a cylindrical cross-section, it is possible to form the side surfaces 4V as a corrugated tube as shown in FIG 4. A second end surface 4B of the hollow body 4 is disposed on a bottom 2B of the housing 2 and can be permanently connected thereto. The cross section of the component or hollow body 4 is adjusted to the cross section of an interior 2R of the housing 2. In the illustrative example shown in the drawing, a defined quantity of sodium 5F is disposed within the hollow body 4.

If the whole pressure element 1 is exposed to a temperature which is higher than the melting point of sodium, then the sodium lies in this temperature range in the form of a liquid and/or a saturated vapor. Since the sodium takes up a greater volume in the liquid phase and in the vapor phase, the hollow body 4 is extended since the length thereof is variable at temperatures above the melting point of sodium. The ram 3 seated on the hollow body 4 is moved outwards out of the housing 2. At the same time, it exerts a pressure force on a device which is connected thereto. With rising temperature, the vapor pressure of the sodium, and therefore the pressure within the hollow body 4, increases. In order to explain the mode of functioning of the pressure element it is assumed, for example, that the hollow body 4 has a volume of 6 cm$^3$ and its end surface 4A has a size of 3 cm$^2$. If the is also assumed that the pressure-dependent spring travel amounts to one centimeter and a neck 3H of the ram has a cross-section of 0.3 cm$^2$, and if the hollow body 4 contains approximately one gram of sodium and is exposed to a temperature of 1000° C., a pressure of 28 bar is exerted on the ram 3 at the then prevailing partial vapor pressure of the sodium of 2.8 bar.

Figure 2:
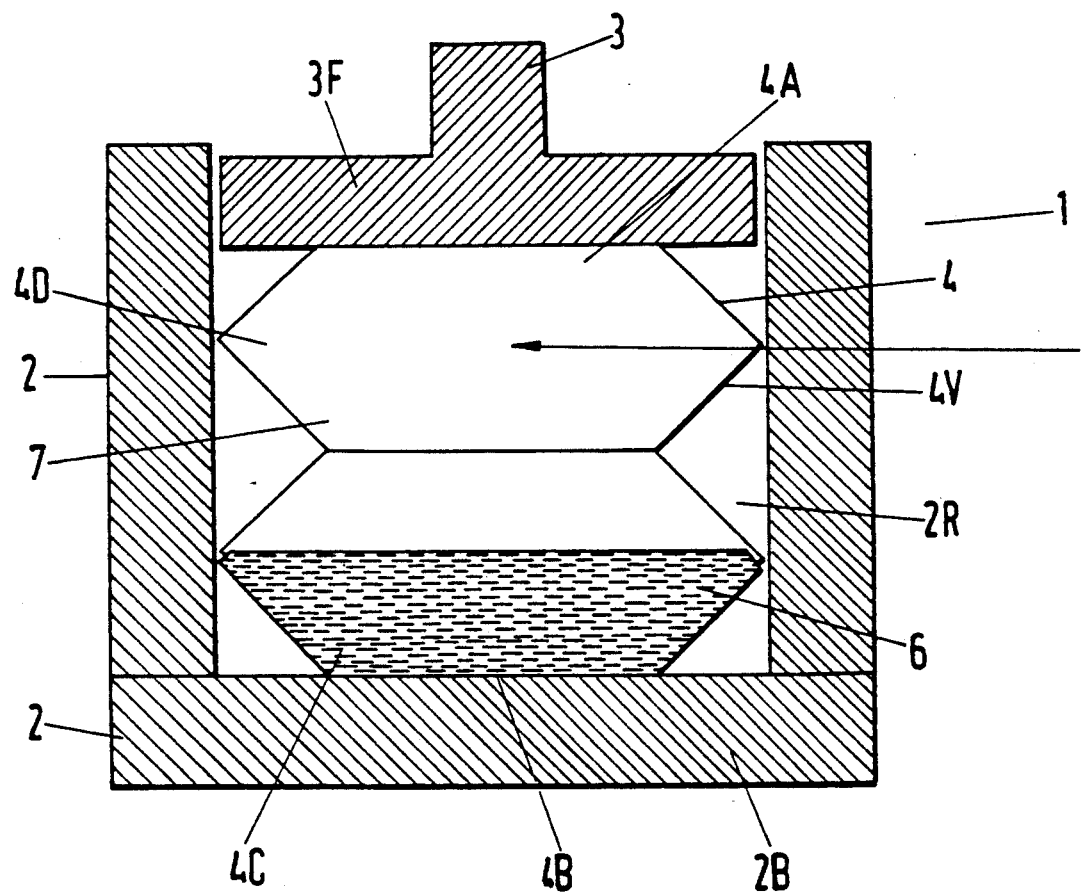
FIG. 2 is a view similar to FIG. 1 showing a variant of the pressure element illustrated therein.
Figure 3:
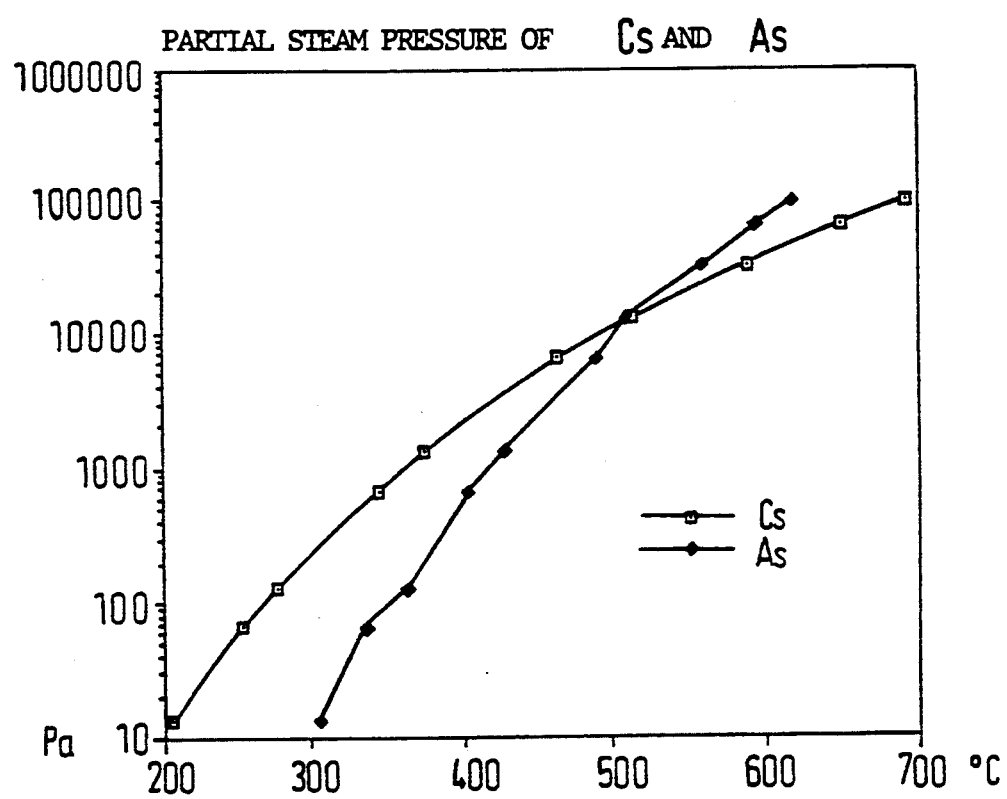
FIG. 3 is a partial vapor pressure diagram.

According to the invention, it is also possible to subdivide the hollow body into two or more chambers, as shown in FIG. 2. In this illustrative example, chambers 4C and 4D are filled with different substances. While the space 4C contains cesium, the space 4D is filled with arsenic. As a result, it is possible to generate defined pressures at defined temperatures. The total pressure of the ram 3 is determined in the temperature range up to 500° C. by the higher pressure of the cesium, and above 500° C. by the pressure of the arsenic. The temperature-dependent partial vapor pressures of arsenic and cesium are shown in FIG. 3.

I claim:

1. A pressure element for generating pressure forces, comprising a first movably mounted component, a second component in communication with said first component, said second component being in the form of a hollow body subdivided into at least two chambers, and means for varying the length of said second component in the form of cesium disposed in one of said chambers and arsenic disposed in another of said chambers for extending said hollow body.

2. The pressure element according to claim 1, wherein said hollow body has lateral boundary surfaces in the form of bellows.

3. The pressure element according to claim 1, wherein said hollow body has lateral boundary surfaces in the form of a corrugated tube.

4. A pressure element for generating pressure forces, comprising a first movably mounted component, a second component in the form of a hollow body subdivided into two chambers having a lateral boundary surface in the form of bellows in communication with said first component, and means in the form of two different substances in the form of cesium and arsenic each disposed in one of said chambers having two phases at a defined temperature for extending said lateral surfaces.

5. The pressure element according to claim 4, wherein said bellows is in the form of a corrugated tube.

* * * * *